US011291976B2

(12) United States Patent
Leonard et al.

(10) Patent No.: US 11,291,976 B2
(45) Date of Patent: Apr. 5, 2022

(54) MIXED VALENT MANGANESE-BASED NOX ADSORBER (71) Applicant: Carus LLC, Peru, IL (US)

(72) Inventors: Rita Leonard, Mendota, IL (US); Viacheslav Iablokov, Peru, IL (US); Motahare Athariboroujeny, LaSalle, IL (US); Kenneth Pisarczyk, Spring Valley, IL (US); Jacob Wildeson, LaSalle, IL (US)

(73) Assignee: Carus LLC, Peru, IL (US)

(*) Notice: Subject to any disclaimer, the term of this patent is extended or adjusted under 35 U.S.C. 154(b) by 0 days.

(21) Appl. No.: 17/072,976

(22) Filed: Oct. 16, 2020

(65) Prior Publication Data
US 2021/0113994 A1 Apr. 22, 2021

Related U.S. Application Data (60) Provisional application No. 62/923,134, filed on Oct. 18, 2019.

(51) Int. Cl.
B01J 23/34 (2006.01)
B01J 35/10 (2006.01)
(Continued)

(52) U.S. Cl.
CPC .......... B01J 23/34 (2013.01); B01D 53/9422 (2013.01); B01J 35/1019 (2013.01);
(Continued)

(58) Field of Classification Search
CPC .... B01J 23/24; B01J 35/1019; B01J 35/1038; B01J 35/1061; B01J 37/0236;
(Continued)

(56) References Cited

U.S. PATENT DOCUMENTS 1,345,323 A  6/1920  Frazer et al.
4,290,923 A  9/1981  Mein et al.
(Continued)

FOREIGN PATENT DOCUMENTS

WO  2016141140  9/2016
WO  2017134065  8/2017

OTHER PUBLICATIONS

Ji et al., Mn-based mixed oxides for low temperature NOx adsorber applications, Applied Catalysis A, General, 2018, pp. 90-101.
(Continued)

Primary Examiner — James A Fiorito
(74) Attorney, Agent, or Firm — Clark Hill PLC (57) ABSTRACT Herein disclosed are compositions for passive NOx adsorption and oxidation that include at least a manganese-based oxide and one or more promoter materials and methods for making and using said compositions. The promotor materials may include a rare earth, transition, or main group metal. The compositions may be used in NOx emission control system and adsorbs NOx compounds at low temperatures and then release NOx at higher temperatures, where the NOx can be oxidized, without the hybridized MnOX composition breaking down. The compositions are capable of maintaining a sufficiently large surface area at high temperatures found in the emissions gas streams of internal combustion engines necessary for the complete elimination of NOx.

10 Claims, 3 Drawing Sheets (51) Int. Cl.
*B01J 37/04* (2006.01)
*B01J 37/03* (2006.01)
*B01J 37/02* (2006.01)
*B01J 37/06* (2006.01)
*B01J 37/08* (2006.01)
*B01D 53/94* (2006.01)
*C01G 45/02* (2006.01)

(52) U.S. Cl.
CPC ....... *B01J 35/1038* (2013.01); *B01J 35/1061* (2013.01); *B01J 37/0236* (2013.01); *B01J 37/031* (2013.01); *B01J 37/04* (2013.01); *B01J 37/06* (2013.01); *B01J 37/08* (2013.01); *C01G 45/02* (2013.01); *B01D 2255/2073* (2013.01); *B01D 2255/9205* (2013.01); *B01D 2255/9207* (2013.01); *C01P 2002/52* (2013.01); *C01P 2006/12* (2013.01); *C01P 2006/14* (2013.01); *C01P 2006/16* (2013.01); *C01P 2006/80* (2013.01)

(58) Field of Classification Search
CPC . B01J 37/031; B01J 37/04; B01J 37/06; B01J 37/08; B01D 53/9422; C01G 45/02
See application file for complete search history.

(56) References Cited

U.S. PATENT DOCUMENTS

| | | |
|---|---|---|
| 4,299,735 A | 11/1981 | Mein et al. |
| 5,260,248 A | 11/1993 | Singh et al. |
| 2003/0045424 A1 | 3/2003 | Burk et al. |
| 2011/0138788 A1 | 6/2011 | Kanda et al. |
| 2014/0065042 A1 | 3/2014 | Andersen et al. |
| 2017/0009623 A1 | 1/2017 | Armitage et al. |

OTHER PUBLICATIONS

Qi et al., NO oxidation to NO2 over manganese-cerium mixed oxides, Catalysis Today, 2015, pp. 1-9, General Motors Global Research and Development, Warren, MI.

Zhang et al., A Highly Active and Stable Non-Platinic Lean NOx Trap Catalyst MnOx K2CO3/K2Ti8O17 with Ultra-Low NOx to N2O Selectivity, Ind. Eng. Chem. Res., 2014, pp. 8416-8425, China.

Machida et al., MnOx—CeO2 Binary Oxides for Catalytic NOx Sorption at Low Temperatures. Sorptive Removal of NOx, Chem. Mater, 2000, pp. 3158-3164, Miyazaki University, Japan.

International Search Report and Written Opinion (Form/ISA/220; Form/ISA/210; and Form/ISA/237) for International App. No. PCTUS20/56075 dated Jan. 19, 2021.

MIXED VALENT MANGANESE-BASED NOX ADSORBER

CROSS REFERENCE TO RELATED APPLICATIONS

This application claims the benefit of U.S. Provisional Patent Application No. 62/923,134, filed on Oct. 18, 2019.

BACKGROUND OF THE DISCLOSURE

1. Field of the Disclosure

This disclosure relates to the field of emissions control, especially catalysts that act as passive nitrogen oxide (NOx) adsorbers in internal combustion engine exhaust gas streams to store NOx gases. The disclosure also relates to the production of said catalysts.

2. Description of the Related Art

Internal combustion engines burn hydrocarbons to convert chemical energy into mechanical energy, while giving off heat and hot gasses as byproducts. These hot gasses are a heterogeneous mixture of chemical compounds of which many are toxic or otherwise dangerous to humans, animals, or the environment. Exhaust emissions present problems related to adding particulate matter (PM), nitrogen oxides (NOx) unburned hydrocarbons (HC) and carbon monoxide (CO) to the atmosphere. NOx is a term used to describe the various chemical species of nitrogen oxides, which include nitrogen monoxide (NO) and nitrogen dioxide ($NO_2$) amongst others. NOx is of concern because, in the upper atmosphere in the presence of sunlight, NOx becomes a major contributor to photo-chemical smog.

One mechanism of emissions control is the use of NOx adsorber catalysts. NOx adsorber catalysts are also referred to in the art as lean NOx, traps (LNTs), deNOx, traps (DNTs) or NOx storage/reduction (NSR) catalysts.

The pressure to achieve better fuel usage and improved mileage has driven engine manufacturers to move towards lean (oxygen rich) operation and lower temperatures in gas streams of emissions control systems. These lower temperatures have an adverse effect upon the typical Platinum Group Metal (PGM) based catalysts found in the emissions control systems of current vehicles. Catalysts for removing undesirable gasses from vehicle exhaust streams usually include a PGM. PGMs include platinum, ruthenium, palladium, and rhodium. The PGM is often accompanied by a co-catalyst for enhancing the catalytic action of such metal. The catalyst and the co-catalyst are supported on a support material such as cordierite monolith. This type of emission catalyst component must have a large specific surface area to be effective. This surface must also be stable under the high temperature conditions experienced by the emissions catalyst and remain free of contaminants, such as sulfur, that can interfere with the activity at the surface of the material.

While efficient in reducing the level of pollutants once they reach their operating temperature (generally above 200° C.), emissions catalysts are relatively less efficient when operating below 200° C., which typically occurs during engine start-up (e.g. the "cold start" period).

One solution to this cold start problem is to adsorb contaminants at the low temperatures that occur during start-up and then later release these adsorbed contaminants once the catalytic systems are at their respective operating temperatures.

NOx adsorption catalysts are designed to adsorb NOx under lean exhaust conditions and release the adsorbed NOx under rich conditions. NOx adsorption catalysts typically include a NOx storage component (ex. Ba) and an oxidation component that typically includes a PGM and one or more co-catalysts.

During normal operation, an engine designed to burn "lean" produces an exhaust emission having a "lean" composition. The NOx adsorber used for NOx storage may trap the NOx that is present in the exhaust emissions. The trapping of the NOx may result in the formation of an inorganic nitrate that may be released when the engine runs under "rich" conditions. When an engine is running under rich conditions, the inorganic nitrates stored by the catalyst may decompose and form nitrogen dioxide and nitric oxide, which may then be catalytically reduced to nitrogen, ammonia, along with hydrocarbons, carbon monoxide, or hydrogen.

Passive NOx adsorbers (PNAs) or low temperature NOx adsorbers (LTNA) are designed to adsorb NOx in the first minutes of the cold start period when the catalytic emission control system does not reach its operating conditions. The stored NOx gas is then released at higher temperature in a lean environment. The desorbed NOx is converted to nitrogen over selective catalytic reduction (SCR) catalyst. State-of-the-art materials include PGMs, preferably palladium, supported onto zeolites and cerium oxide. However, the presence of CO molecules in the gas flow decreases NOx storage continuously. Pd-based samples show deactivation in repeated temperature ramp cycles up to 300° C.

Manganese salts and oxides have been used as components or precursors in catalyst wash coats; however, a shortcoming of these manganese salts and oxides is that they decompose at temperatures greater than 550° C., and thus lack the stability to be effective at operating temperatures for internal combustion engine emissions systems.

Shortcomings of existing PGM based catalysts include poor low temperature adsorption efficiency and high cost of the PGMs.

Shortcomings of cerium- and zirconium-oxide based co-catalysts include poor low temperature performance below 200° C.

What is needed is a manganese-based NOx adsorber that is stable at the operating temperatures found in internal combustion engine emissions systems that has a high surface area per unit weight that is competitive or superior to prior art NOx adsorbers. What is also needed is a log temperature adsorber/catalyst that releases the adsorbed NOx as $NO_2$ to assist in downstream processes, such as the fast SCR reaction and/or soot oxidation, which only employ $NO_2$.

BRIEF SUMMARY OF THE DISCLOSURE

In aspects, the present disclosure is related to emissions control, especially passive NOx adsorbers in internal combustion engine exhaust gas streams.

One embodiment according to the present disclosure includes a method of preparing a manganese-based adsorber/catalyst including step of: combining a manganese salt, a first promoter, and an oxidizer to form a catalyst where the manganese is in the $Mn^{+2}$, $Mn^{+3}$, $Mn^{+4}$ state or in any intermediate valance. In the method, the first promoter includes one of: aluminum (Al), barium (Ba), cerium (Ce), lanthanum (La), copper (Cu), iron (Fe), magnesium (Mg), titanium (Ti), yttrium (Y), zirconium (Zr), and zinc (Zn); and the second promoter includes one of: aluminum (Al), barium (Ba), cerium (Ce), lanthanum (La), copper (Cu), iron (Fe), potassium (K), magnesium (Mg), titanium (Ti), yttrium (Y), zirconium (Zr), and zinc (Zn). The method may also include adding a second promoter selected from the same list as the first promoter. The first promoter and the second promoter may have the same or different chemical formulas.

Another embodiment according to the present disclosure includes a method of preparing a manganese-based catalyst including the steps of: combining a manganese salt and a first promoter in a solution; adding an oxidizer to the solution to form a slurry; precipitating non-oxidizable reactant metals from the slurry; aging the precipitated slurry; separating a precipitate from the aged slurry; washing the precipitate with deionized water; drying the precipitate at 105° C. to 200° C. for about 1 to 4 hours; and calcining the precipitate at between 250° C. and 800° C. for 1-12 hours. The calcining step may include heating the precipitate at 2-50° C./minute to the 250° C. and 800° C. The first promoter may include one of: aluminum (Al), barium (Ba), cerium (Ce), lanthanum (La), copper (Cu), iron (Fe), magnesium (Mg), titanium (Ti), yttrium (Y), zirconium (Zr), and zinc (Zn). The oxidizer may include at least one of: a manganate salt, a permanganate salt, and hydrogen peroxide. The method may also include combining a second promoter with the solution prior to precipitating the non-oxidizable reactant metals. The second promoter may include one of: aluminum (Al), barium (Ba), cerium (Ce), lanthanum (La), copper (Cu), iron (Fe), potassium (K), magnesium (Mg), titanium (Ti), yttrium (Y), zirconium (Zr), and zinc (Zn). The method may also include a step of adding a surface modifying agent to the precipitate before the calcining step. The surface modifying agent may include at least one of: short chain organic acids, polyols, sugars, polyvinyl alcohol, polyethylene glycol-200, simple alcohols and organic surfactants. The step of precipitating non-oxidizable reactant metals may include adding a base to the solution. The step of aging may include adding to the solution at least one organic surfactant.

Another embodiment according to the present disclosure includes a method of preparing a manganese-based catalyst including the steps of: combining a manganese salt and at least one promoter in a solution; adding an oxidizer to the solution to form a slurry; performing an ion exchange on the slurry by adding an additional promoter; aging the slurry; separating a precipitate from the aged slurry; washing the precipitate with deionized water; drying the precipitate at 105° C. to 200° C. for about 1 to 4 hours; and calcining the precipitate at between 250° C. and 800° C. for 1-12 hours. The calcining step may include heating the precipitate at 2-50° C./minute to the 250° C. and 800° C. The first promoter, the second promoter, and the third promoter may each include one of: aluminum (Al), barium (Ba), cerium (Ce), lanthanum (La), copper (Cu), iron (Fe), magnesium (Mg), titanium (Ti), yttrium (Y), zirconium (Zr), and zinc (Zn). The method may further include adding a surface modifying agent to the precipitate before the calcining step. The surface modifying agent may include at least one of: short chain organic acids, polyols, sugars, polyvinyl alcohol, polyethylene glycol-200, simple alcohols and organic surfactants. The step of aging may include adding to the solution at least one organic surfactant.

Another embodiment according to the present disclosure includes a composition of matter including: a first promoter, including one of: aluminum (Al), barium (Ba), cerium (Ce), lanthanum (La), copper (Cu), iron (Fe), potassium (K), magnesium (Mg), titanium (Ti), yttrium (Y), zirconium (Zr), and zinc (Zn); a second promoter, including one of: aluminum (Al), barium (Ba), cerium (Ce), lanthanum (La), copper (Cu), iron (Fe), magnesium (Mg), titanium (Ti), yttrium (Y), zirconium (Zr), and zinc (Zn); manganese; and oxygen, according to the formula $A_a B_b Mn_y O_x$, wherein A is the first promoter, B is the second promoter, the additive value of a, b, and y is 1, and x is selected to balance the valences of the formula. The composition may have a formula such that a is in a range of 0.05-0.25; b is in a range of 0.05-0.25; and y is in a range of 0.50-0.90. The $Mn_y O_x$ component may be 50-70 wt % of the composition. The composition may exhibit one or more of the following properties: a specific surface area of between 150 square meters per gram and 250 square meters per gram at room temperature; a NOx adsorption value of greater than 50 micromoles of NOx per gram at 100° C.; a NOx adsorption value of greater than 60 micromoles of NOx per gram at 300° C.; a pore diameter between 5 nanometers and 20 nanometers; a pore volume between 0.3 mL/g and 0.5 mL/g; not producing $N_2O$ when in an exhaust gas stream in a temperature range of 100 to 350° C.; and continuously adsorbing or releasing NOx when in an exhaust gas stream that is within a temperature range of 200 to 350° C.

Another embodiment according to the present disclosure includes a method for preparing manganese-based catalyst, the method including: synthesizing $A_a B_b Mn_y O_x$ in a solution, where A is a first promoter, B is a second promoter, the additive value of a, b, and y is 1, and x is the balance of oxygen; isolating the $A_a B_b Mn_y O_x$ from the solution; washing the $A_a B_b Mn_y O_x$ in deionized water; drying the $A_a B_b Mn_y O_x$ at 105-150° C.; calcining the $A_a B_b Mn_y O_x$ at 450° C.; and aging the $A_a B_b Mn_y O_x$ at 450-1,100° C. The synthesizing step may include performing one of: co-precipitation, redox precipitation, ion-exchange, hydrothermal synthesis, thermal synthesis, and a sol-gel process. The first promoter and the second promoter may each include at least one of: aluminum (Al), barium (Ba), cerium (Ce), copper (Cu), iron (Fe), magnesium (Mg), titanium (Ti), yttrium (Y), and zirconium (Zr).

Another embodiment according to the present disclosure includes a manganese oxide composition including: a manganese salt; and a promoter; wherein the ratio of the manganese oxide to promoter is about 1 to about 0.2 to 0.3. The promoter may include at least one of: aluminum (Al), barium (Ba), cerium (Ce), copper (Cu), iron (Fe), magnesium (Mg), titanium (Ti), yttrium (Y), and zirconium (Zr).

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

A better understanding of the present disclosure can be obtained with the following detailed descriptions of the various disclosed embodiments in the drawings, which are given by way of illustration only, and thus are not limiting the present disclosure, and wherein.

DETAILED DESCRIPTION OF THE DISCLOSURE

The present disclosure is susceptible to embodiments of different forms. There are shown in the drawings, and herein will be described in detail, specific embodiments with the understanding that the present invention is to be considered an exemplification of the principles and is not intended to limit the present invention to that illustrated and described herein.

The present invention concerns a composition comprising at least a manganese-based mixed oxide comprising manganese (Mn) and, optionally, at one or more promoter elements (A, or B), where the promoter element (A, B, C . . . ) or elements may be one or more of: aluminum (Al), barium (Ba), cerium (Ce), lanthanum (La), copper (Cu), iron (Fe), magnesium (Mg), titanium (Ti), yttrium (Y), zirconium (Zr), and zinc (Zn). The oxidation state of the central manganese atom in the final composition can be any of: $Mn^{+2}$, $Mn^{+3}$, or $Mn^{+4}$, and the number of oxygen (O) components may vary.

The $A_aB_bMn_yO_x$ material may exhibit a specific surface area (SBET) of >200 square meters per gram after the first calcination and a specific surface area (SBET) of >10 square meters per gram after the ageing at 950° C. for about 1 to 4 hours. The material may exhibit a low temperature (100° C.) NOx adsorption value of >50 micromoles NOx per gram after aging at 650° C. and a total (300° C.) NOx adsorption value of >70 micromoles NOx per gram after aging at 650° C.

More specifically, in some embodiments, the material may exhibit a low temperature (100° C.) NOx adsorption value of >80 micromoles NOx per gram after aging at 650° C. and a total (300° C.) NOx adsorption value of >90 micromoles NOx per gram after aging at 650° C.

$A_aB_bMn_yO_x$ is resistant to temperatures in the combustion exhaust stream in the range of 650-800° C. without significant change of catalytic activity and performance.

This disclosure also shows methods of manufacturing $A_aB_bMn_yO_x$ material. These methods may include steps involving specific sequences of co-precipitation, redox precipitation, pH, precipitation, ion-exchange methods, hydrothermal methods, sol-gel methods, template methods, acid washing, calcining, and thermal methods.

Definitions

Throughout the description, including the claims, the term "comprising one" should be understood as being synonymous with the term "comprising at least one", unless otherwise specified, and "between" should be understood as being inclusive of the limits.

The NOx storage capacity is defined as the number of NOx molecules (in micromole of NOx per gram of catalyst) being adsorbed over the samples in the isothermal region at 100° C. for the first 15 min. Additional adsorption may take place at higher than 100° C. temperature. The NO oxidation is defined as the number of NO molecules contained in the incoming exhaust gas stream that has been oxidized to $NO_2$. NOx storage and catalytic performance may be measured by flowing a synthetic gas mixture containing: 200 ppm NO, 211 ppm CO, 165 ppm $C_3H_8$, 5% $CO_2$, 5% $H_2O$, and 11.6% $O_2$ at a Gas Hourly Space Velocity (GHSV) of 50,000 $h^{-1}$ through the material. The temperature in a powder reactor may be held at 100° C. for the first 15 minutes followed by a 10° C. per minute temperature ramp up to 500° C.

It is specified that, in the continuation of the description, unless otherwise indicated, the values at the limits are included in the ranges of values which are given. The proportions for the gases and the mixtures of gases are given in vol % and ppm. The volume flow rates and the vol % are given at 1 atmosphere and 20° C. Specifying any range of concentrations, any listed upper bound of a concentration range can be associated with any listed lower bound of a concentration range.

The contents are given as the molar ratio of the cations which sum to one, unless otherwise indicated. Oxide refers there to final mixed oxide defined as integration of various element oxides composing the composition.

The term "consisting of" means the embodiment necessarily includes the listed components and may also include additional unrecited oxide elements such as impurities, which may specifically originate from its preparation method, for example raw materials or starting reactants used, notably in an amount less than 2% by weight, more preferably less than 1% by weight, of the total mixed oxide. Proportions of impurities may be determined using the inductively coupled plasma mass spectrometry (ICPMS), atomic spectrophotometry, inductively coupled plasma emission spectroscopy (ICPOES), x-ray fluorescence spectroscopy or other techniques known to persons of skill in the art.

In the continuation of the description, the term "specific surface area" is understood to mean the BET specific surface area determined by nitrogen adsorption in accordance with standard ASTM D 3663-78 laid down from the Brunauer-Emmett-Teller method described in the periodical "The Journal of the American Chemical Society, 60, 309 (1938)". Specific surface areas are expressed for a designated calcination temperature and time.

The calcinations, at the end of which the surface area values are given, are calcinations in air unless otherwise specified. Furthermore, the specific surface area values which are indicated for a given temperature and a given time correspond, unless otherwise indicated, to calcinations at a temperature held over the time indicated.

A rare earth element (REE) or rare earth metal (REM), as defined by IUPAC, is one of a set of seventeen chemical elements in the periodic table, specifically the fifteen lanthanides, as well as scandium and yttrium. Rare earth elements are cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) and yttrium (Y).

The mixed valent passive NOx adsorber with a general formula of $A_aB_bMn_yO_x$, where a+b+y=1 and x is the value of oxygen required to balance the valences of the formula. The composition may include:

50-90 mol % of manganese;
  5-25 mol % of at least one promoter from the list of aluminum (Al), barium (Ba), cerium (Ce), lanthanum (La), copper (Cu), iron (Fe), magnesium (Mg), titanium (Ti), yttrium (Y), zirconium (Zr), and zinc (Zn); and
  5-25 mol % of second promoter from the list of aluminum (Al), barium (Ba), cerium (Ce), lanthanum (La), copper (Cu), iron (Fe), magnesium (Mg), titanium (Ti), yttrium (Y), zirconium (Zr), and zinc (Zn). In some embodiments, the first and the second promoter may be the same, in which case a single promoter material may have a range of 10-50 mol %.

These elements are generally present as oxides. However, it is not excluded that they may be present at least partly in the form of hydroxides or oxyhydroxides. The proportions of these elements can be determined using standard analytical techniques, such as x-ray diffraction analysis and the active oxygen method. Preferably manganese is manganese oxide, and the promoter is a metal selected as described above other than manganese oxide.

In some embodiments, the composition may be manganese oxide 50-70 wt %. In some embodiments, the ratio of manganese oxide to promoter(s) is about 1 to 0.2-0.3. Some exemplary, but not limiting, embodiments include $Al_{0.1}Ce_{0.2}Mn_{0.7}O_x$, $Zr_{0.2}Ce_{0.1}Mn_{0.7}O_x$, and $Zr_{0.25}Al_{0.25}Mn_{0.5}O_x$.

In some embodiments, the promoter may be an oxide as well. For example, manganese combined with yttrium, could be manganese oxide with yttrium or manganese oxide with yttrium oxide.

The mixed oxides of the present disclosure have specific properties, such as one or more of: 1) specific surface areas measured at room temperature ranging from 150 $m^2/g$ to 250 $m^2/g$; 2) adsorption values ranging from 40 micromoles/g to 70 micromoles/g; 3) average pore diameters of between 5 nm and 20 nm; and 4) total pore volumes of between 0.3 mL/g and 0.5 mL/g.

The total pore volume and pore diameter may be measured by ordinary $N_2$ porosimetry. It mainly consists in a gas adsorption method determination of pore size distribution, using capillary condensation phenomenon and the principle of equivalent substitution volume.

Specific surface area may be measured using BET surface area instrumentation or other suitable equipment in accordance with standard industry practices. Adsorption may be measured using a Horiba SA-6000 Series Surface Area Analyzer or other suitable equipment in accordance with standard industrial practices. Pore size may be measured using Micromeritics Tri Star II 3020 Automatic Physisorption Analyzer or other suitable equipment in accordance with standard industrial practices. Pore volume may be measured using Micromeritics TriStar II 3020 or other suitable equipment in accordance with standard industrial practices.

Catalyst performance may be measured to confirm one or more of the above properties. The samples may be aged in moist air (2% vol $H_2O$) at 650° C. for 16 hours in a horizontal tube furnace, or equivalent. Then, the samples may be transferred into a powder plug-flow reactor. In one example, 0.21 g of as-aged samples is loaded into a quartz tube reactor and diluted with sand (typically with a 1:1 ratio) to ensure 50,000 GHSV. First, a gas mixture containing 5% $CO_2$, 5% $H_2O$, and 11.6% $O_2$ balanced with nitrogen may be used to precondition the samples. A heating ramp of 10° C./min is applied to reach 500° C. and then kept for 15 min at maximum temperature. The sample is allowed to cool to 100° C. A reactive gas mixture is set to 201 ppm NO, 211 ppm CO, 165 ppm $C_3H_8$, 5.0% $CO_2$, 5% $H_2O$, and 11.0% $O_2$ balanced with nitrogen while bypassing the reactor. Then, the reactive gas mixture is abruptly switched to the reactor. The adsorption of NOx is followed by Thermo-Fischer 42 iHL NOx analyzer. After the first 15 minutes, a heating ramp of 10° C./min is applied from 100° C. to 500° C. to induce temperature programmed NO oxidation. NOx storage capacity is measured at 100° C. Total NOx capacity is measured (additional adsorption may take place at higher temperature) at 300° C. NO oxidation is also measured at 300° C.

Further, the composition may release NOx for catalysis at temperatures of about 50° C. to about 800° C. without decomposing. The composition does not produce $N_2O$ when in an exhaust gas stream in a temperature range of 100 to 350° C.

Further, the composition, after aging at 950° C. for 16 hours and testing for oxygen storage capacity at 500° C., may store and release greater than 500 micromoles oxygen per gram material.

Methods of Manufacture

Figure 1:
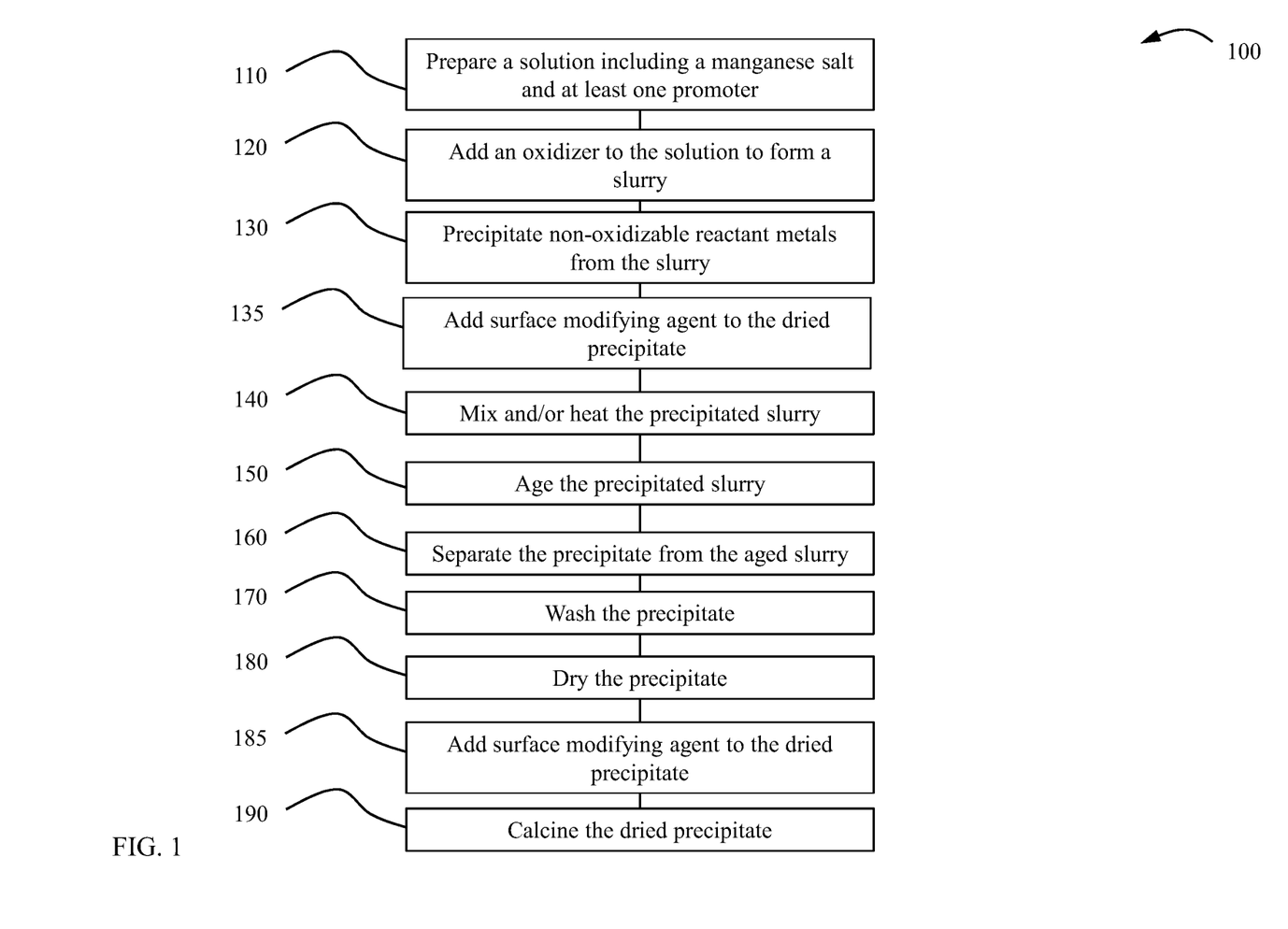
FIG. 1 is a flow chart of a method of manufacturing a manganese oxide-based catalyst according to one embodiment of the present disclosure.

FIG. 1 shows a method 100 of manufacturing an embodiment of a hybridized MnOX composition according to the present disclosure. In step 110, a solution including a manganese salt, a first promoter and an optional second promoter may be prepared. The manganese salt has a lower valence of either +2 or +3. In some embodiments, an acid, such as nitric acid, may be added to place the manganese sale, the first promoter, and the optional second promoter into solution.

In this case, chlorides, sulfates, hydroxides, oxides, carbonates or nitrates of the following elements: aluminum (Al), barium (Ba), cerium (Ce), lanthanum (La), copper (Cu), iron (Fe), potassium (K), magnesium (Mg), titanium (Ti), yttrium (Y), zirconium (Zr), and zinc (Zn) may be used as the first and second promoters. The solution is comprised of a manganese salt is mixed with at least one promoter salt in the required molar ratios in water. The amount of water used may be adjusted to have an intermediate solids content of 3.5 to 5.5% by mass in slurry as calculated as oxides. Mineral acids may be added to aid in the dissolution of the reactant salts, such as nitric acid, sulfuric acid, hydrochloric acid and other suitable inorganic acids known to persons of skill in the art. The solution is continuously mixed to ensure complete dispersion of the reactants. The temperature of the solution may be maintained between 20° C. to 80° C. prior to the synthesis of an intermediate product.

In step 120, an oxidizer, such as a manganate salt, permanganate salt, or hydrogen peroxide is added to the solution in the appropriate ratio to attain the desired final oxidation state of the products, over a period of 30 minutes to three hours. The product may be washed after the time period in solution is complete.

In step 130, a base, such as sodium hydroxide, potassium hydroxide, ammonium hydroxide, sodium bicarbonate or sodium carbonate may be added over a period of 30 minutes to three hours in the appropriate quantity to fully precipitate the non-oxidizable reactant metals and to attain a final slurry pH in the range of 7.5 to 10.0. Steps 120 and 130 may be performed alternately, sequentially or concurrently, and the oxidizer and the base may be added to the solution as a solid or in aqueous form to produce a slurry.

In optional step 135, a surface modifying agent that will react with the precipitated material to preserve structure, diameter, and surface area of the pores of the precipitate during the later heating or aging steps may be added to the solution. Surface modifying agents may include organic compounds that react rapidly during heating or aging of the precipitate. The surface modifying agent may include one or more of: short chain organic acids, polyols, sugars, polyvinyl alcohol, polyethylene glycol-200, simple alcohols, and organic surfactants. When heated or aged, the surface modifying agent may modify the crystal structure and materials morphology and pore structure of the precipitate in solution to enhance its activity.

In step 140, the slurry may be mixed and/or heated to improve uniformity of the mixture. The temperature during the synthesis step may be increased to between 40° C. and 80° C. for subsequent aging. A static mixer and a tank reactor are used at the same time to produce a mixed metal oxide via a redox precipitation method. The use of a Continuous Stirred Tank Reactor (CSTR) allows for a more complete and uniform reaction.

Solids Separation

Aging

In step 150, the slurry may be aged. It is common to retain the solids slurry at the precipitation temperature and pH for a period ranging from about 10 minutes to about 6 hours depending on the composition of the solution. During aging, one or more organic surfactants, such as polyvinyl alcohol (PVA) polyvinyl amine, polyethylene glycol-200 (PEG 200), triton X-100, isopropyl alcohol and ethanol may be used to enlarge pore structure. The dosage is 0.1% to 10%. In some embodiments, the dosage may be 1% to 5%.

Separation of Solid-Liquid

In step 160, a precipitate may be separated from the solution after aging, which is the intermediate product. The precipitate in the slurry should be separated from the salt solution that remains after the reaction. The solid-liquid separation can be carried out using vacuum filtration, frame pressure filtration, or centrifugation.

Washing

In step 170, the precipitate may be washed. In some embodiments, the washing process may reduce the salt content from the precipitate. A washing process may remove salts that can act as catalyst poisons and degrade the efficiency of the catalyst. The total alkali in the final product should be less than 3%. In general, an amount of 10 to 30 times the volume of the slurry of deionized water should be used in washing in order to get a product with a total alkali count below 3%.

Drying

In step 180, the washed precipitate may be dried. The drying process can be carried out in an oven flash dryer or spray dryer. The drying temperature may be between 105° C. and 200° C. for about 1 to 4 hours.

In optional step 185, a surface modifying agent that will react with the dried precipitate to preserve structure, diameter, and surface area of the pores of the precipitate during the later calcination step may be added. In some embodiments, step 185 may be performed on the washed precipitate prior to drying step 180. Surface modifying agents may include organic compounds that react rapidly during calcination of the dried precipitate. The surface modifying agent may include one or more of: short chain organic acids, polyols, sugars, polyvinyl alcohol, polyethylene glycol-200, simple alcohols, and organic surfactants. When calcined, the surface modifying agent may modify the crystal structure and materials morphology and pore structure of the dried precipitate to enhance its activity. Optional step 185 is not performed if a surface modifying agent has already been introduced in step 135.

Calcination:

In step 190, the dried precipitate may be calcined. A muffle furnace, tube furnace or tunnel furnace may be used to calcine the dried precipitate. The calcination temperature may be between 250° C. and 800° C. The temperature and time may be determined by the specific formulation. The calcination temperature may be reached using a temperature ramp of between 1 and 50° C./minute to a final temperature between 450° C. and 800° C. The atmosphere within the calcinator may be oxidizing (air), reducing ($H_2$, CO in nitrogen), or inert (nitrogen).

After calcination, the composition adhering to the formula $A_a B_b Mn_y O_x$ can be verified through chemical testing. More specifically, the final composition may be $A_{0.05-0.25} B_{0.05-0.25} Mn_{0.50-0.90} O_x$ where A is the first promoter, B is the second promoter and x is the value of oxygen required to balance the valences of the formula. In some embodiments, A and B are the same element and the formula may be expressed as $A_{0.10-0.50} Mn_{0.50-0.90} O_x$.

In one exemplary and non-limiting embodiment, the method 100 may be performed in the following manner. A first solution of cerium nitrate and zirconium nitrate may be dissolved in water with a manganese salt. Nitric acid may be added to completely dissolve the salts. Then a second solution containing potassium permanganate may be added to the solution. The second solution may also include sodium carbonate. The ratio of salts in the first solution to the potassium permanganate in the second solution may be about 1.25.

The combination of the first solution and second solution form a slurry. The combination process may include slow stirring or agitation controlled to reduce foaming and ensure complete mixing. The amount of sodium carbonate in the second solution may be adjusted to control the pH of the slurry. In this example, the target pH for the slurry is in a range of 7.5 to 10.0. Additional nitric acid or sodium carbonate may be added to the slurry to secure the desired pH value. Then the slurry may be heated and stirred at about 52° C. for about 3 hours. Excess soluble salts may be filtered out and the remaining slurry heated and aged at about 52° C. for about 1 hour. After aging, the precipitate may be separated from the slurry, and then the precipitate may be washed, dried, and finally calcined for about 2 hours at 250° C. to form the final composition.

Figure 2:
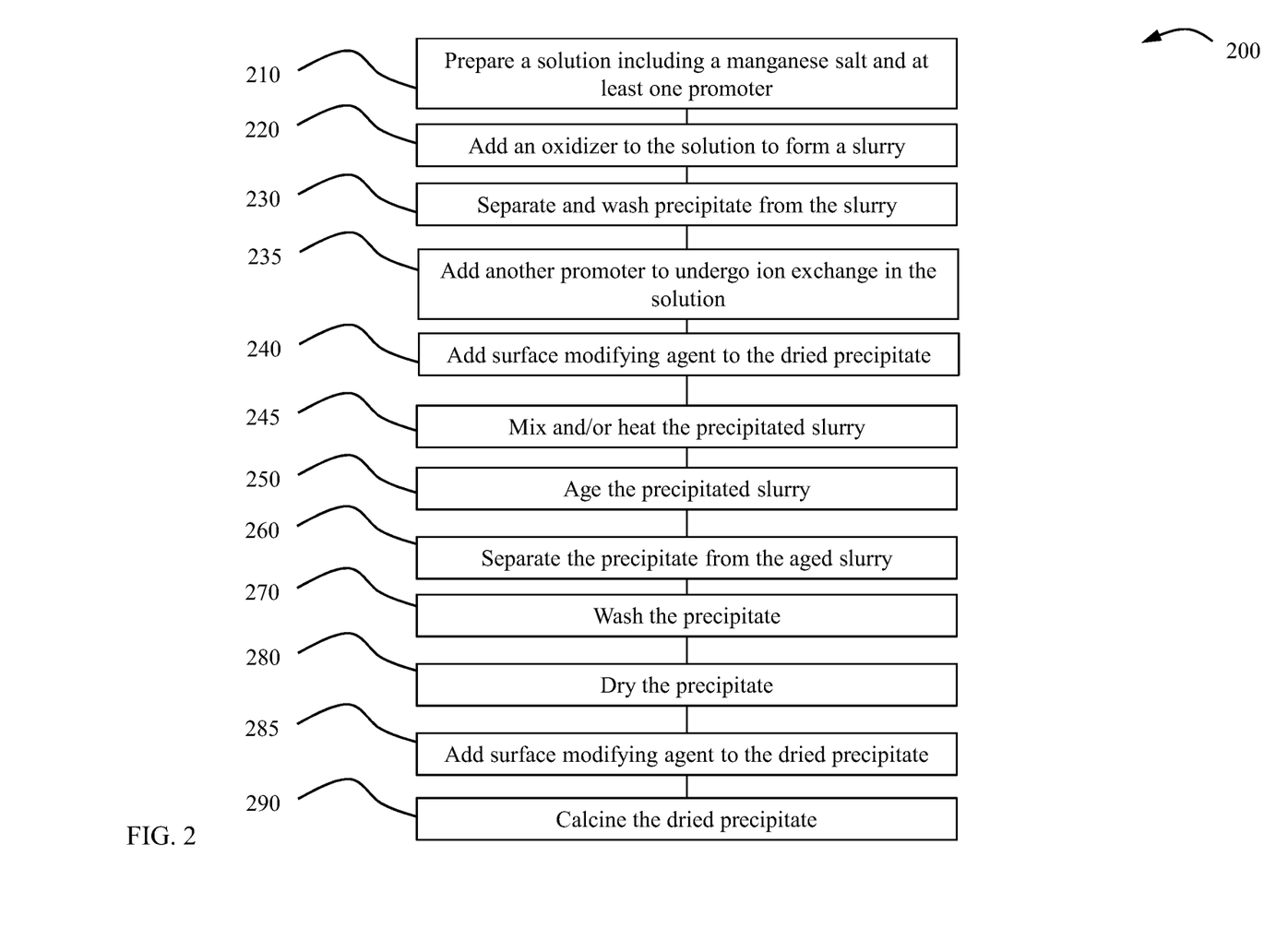
FIG. 2 is another flow chart of another method of manufacturing a manganese oxide-based catalyst according to another embodiment of the present disclosure.

FIG. 2 shows a method 200 of manufacturing an embodiment of a hybridized MnOX composition according to the present disclosure. In step 210, a solution including a manganese salt, the first promoter and the optional second promoter may be prepared. In some embodiments, an acid, such as nitric acid, may be added to place the manganese salt, the first promoter, and the optional second promoter into solution.

In this case, chlorides, sulfates, hydroxides, oxides, carbonates or nitrates of the following elements: aluminum (Al), barium (Ba), cerium (Ce), lanthanum (La), copper (Cu), iron (Fe), magnesium (Mg), titanium (Ti), yttrium (Y), zirconium (Zr), and zinc (Zn) may be used as starting materials. The solution is comprised of a manganese salt is mixed with two promoter salts in the required molar ratios in water. The amount of water used may be adjusted to have an intermediate solids content of 3.5 to 5.5% by mass in slurry as calculated as oxides. Mineral acids may be added to aid in the dissolution of the reactant salts, such as nitric acid, sulfuric acid, hydrochloric acid and other suitable inorganic acids known to persons of skill in the art. The solution is continuously mixed to ensure complete dispersion of the reactants. The temperature of Solution A will be maintained between 20° C. to 80° C. prior to the synthesis of the intermediate product.

In step 220, an oxidizer, such as a manganate salt, permanganate salt, or hydrogen peroxide is added to the solution in the appropriate ratio to attain the desired final oxidation state of the products, over a period of 30 minutes to three hours to form a slurry.

In step 230, the product may be separated and washed. In step 235, a third promoter may be added and undergo ion exchange to form the intermediate product. The third promoter is the same as at least one of the first promoter and the second promoter.

In optional step 240, a surface modifying agent that will react with the precipitated material to preserve structure, diameter, and surface area of the pores of the precipitate during the later heating or aging steps may be added to the solution. Surface modifying agents may include organic compounds that react rapidly during heating or aging of the precipitate. The surface modifying agent may include one or more of: short chain organic acids, polyols, sugars, polyvinyl alcohol, polyethylene glycol-200, simple alcohols, and organic surfactants. When heated or aged, the surface modifying agent may modify the crystal structure and materials morphology and pore structure of the precipitate in solution to enhance its activity.

In step 245, the slurry may be mixed and/or heated to improve uniformity of the intermediate product. The temperature during the synthesis step may be increased to between 40° C. and 80° C. for subsequent aging. A static mixer and a tank reactor are used at the same time to produce a mixed metal oxide via a redox precipitation method. The use of a Continuous Stirred Tank Reactor (CSTR) allows for a more complete and uniform reaction.

Aging

In step 250, the slurry may be aged. It is common to retain the solids slurry at the precipitation temperature and pH for a period of ranging from about 10 minutes to about 6 hours depending on the composition of the solution. During aging, one or more organic surfactants, such as polyvinyl alcohol (PVA) polyvinyl amine, polyethylene glycol-200 (PEG 200), triton X-100, isopropyl alcohol and ethanol can be used for enlarging pore structure. The dosage is 0.1% to 10%. In some embodiments the dosage is 1% to 5%. In some embodiments, step 250 may take place before step 230.

Separation of Solid-Liquid

In step 260, a precipitate may be separated from the solution after aging. The precipitate in the slurry should be separated from the salt solution that remains after the reaction. The solid-liquid separation can be carried out using vacuum filtration, frame pressure filtration or centrifugation.

Washing

In step 270, the precipitate may be washed. In some embodiments, the washing process may reduce the salt content from the precipitate. A washing process may remove salts that can act as catalyst poisons and degrade the efficiency of the catalyst. The total alkali in the final product should be less than 3%. In general an amount of 10 to 30 times of deionized water should be used in washing in order to get a product with a total alkali count below 1%.

Drying

In step 280, the washed precipitate may be dried. The drying process can be carried out in an oven, flash dryer or spray dryer. The drying temperature may be between 105° C. and 200° C. for about 1 to 4 hours.

Optional step 285 adds a surface modifying agent that will react with the dried precipitate to preserve structure, diameter, and surface area of the pores of the precipitate during the subsequent calcination step. Surface modifying agents may include organic compounds that react rapidly during calcination of the dried precipitate. The surface modifying agent may include one or more of: short chain organic acids, polyols, sugars, polyvinyl alcohol, polyethylene glycol-200, simple alcohols and organic surfactants. When calcined, the surface modifying agent may modify the crystal structure and materials morphology and pore structure of the dried precipitate to enhance its activity. Optional step 285 is not performed if a surface modifying agent has already been introduced in step 240.

Calcination:

In step 290, the dried precipitate may be calcined. A muffle furnace, tube furnace or tunnel furnace may be used to calcine the dried precipitate. The calcination temperature may be between 250° C. and 800° C. The temperature and time may be determined by the specific formulation. The atmosphere within the calcinator may be oxidizing (air), reducing ($H_2$, CO in Nitrogen), or inert (Nitrogen).

After calcination, the composition adhering to the formula $A_a B_b Mn_y O_x$ can be verified through chemical testing. More specifically, the final composition may be $A_{0.05-0.25} B_{0.05-0.25} Mn_{0.50-0.90} O_x$ where A is the first promoter, B is the second promoter and x is the value of oxygen required to balance the valences of the formula. In some embodiments, A and B are the same element and the formula may be expressed as $A_{0.10-0.50} Mn_{0.50-0.90} O_x$.

Thermal Method

Figure 3:
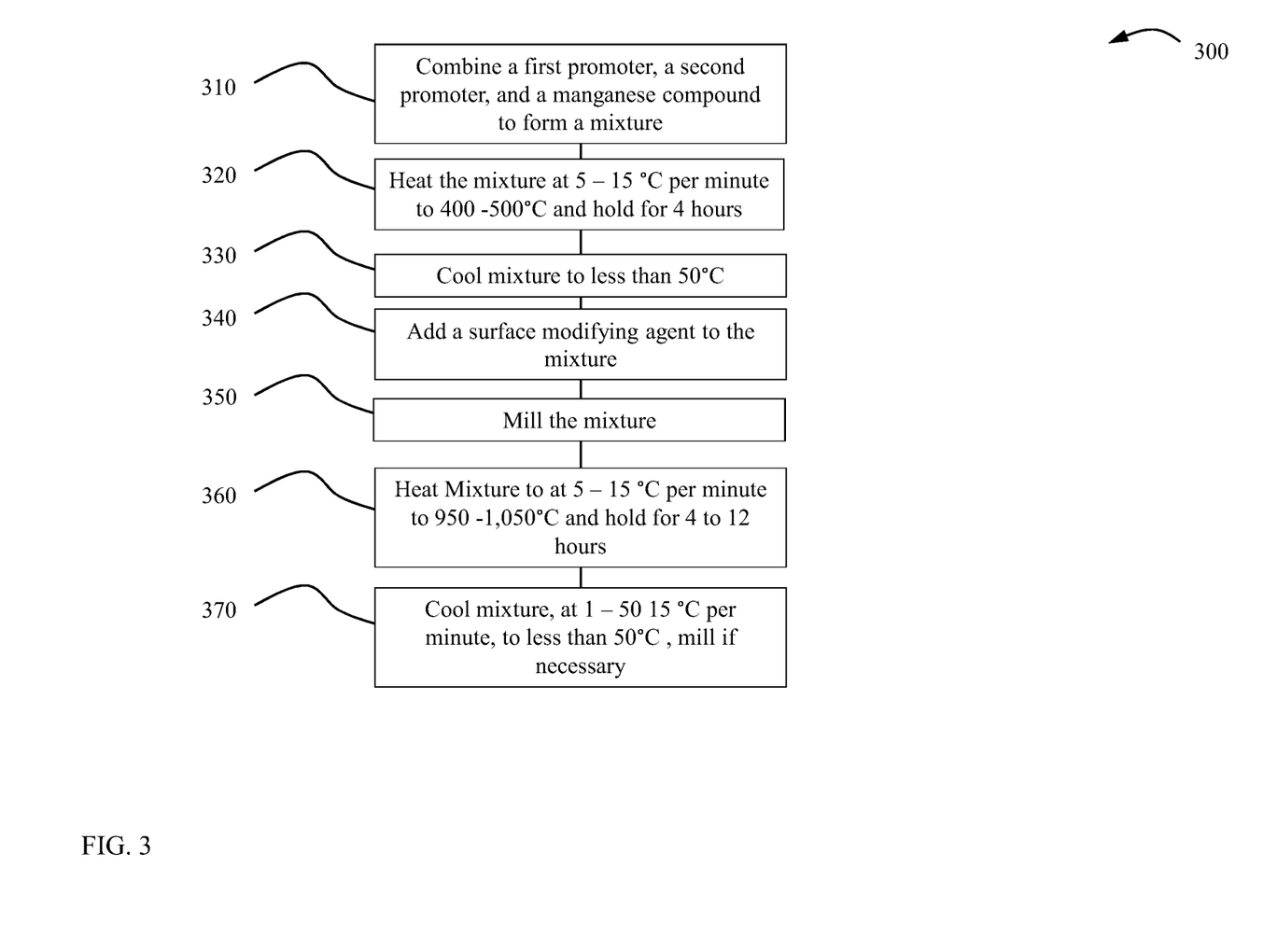
FIG. 3 is another flow chart of another method of manufacturing a manganese oxide-based catalyst according to another embodiment of the present disclosure.

FIG. 3 shows a flow chart of another method 300 for manufacturing an embodiment of a hybridized MnOX composition according to the present disclosure. In step 310, a solution including the first promoter, the second promoter, and a lower valence (+2 or +3) manganese salt may be prepared. In some embodiments, the solution may include an acid, such as nitric acid, to place the first promoter, the second promoter, and the manganese salt into solution.

In this case, oxides, hydroxides, carbonates or nitrates of the following elements: aluminum (Al), barium (Ba), cerium (Ce), lanthanum (La), copper (Cu), iron (Fe), magnesium (Mg), titanium (Ti), yttrium (Y), zirconium (Zr), and zinc (Zn) are used as starting materials. A manganese nitrate, or carbonate may be added with a magnesium, aluminum, titanium or barium oxide or nitrate in the required molar ratio.

In step 320, the mixture may be heated to 400-500° C. for a period of about four hours. The mixture is periodically mixed to ensure complete dispersion of the reactants. In step 330, the mixture may be cooled to below 50° C. In step 340, a surface modifying agent may be added to the mixture. In step 350, the mixture may be milled. In some embodiments, some or all of the steps 330-350 are optional. In some embodiments, steps 330-350 may be performed out of order. In step 360, the mixture may be heated at an increased temperature of 950-1050° C. at a rate of between 1 and 50° C./minute and held for 4 to 12 hours to form a mixed oxide catalyst. The atmosphere can either be oxidizing, inert or reducing depending upon the specific formulation.

In step 370, the mixed oxide catalyst is cooled under a dry inert atmosphere to a temperature below 50° C. and either packaged as the final catalyst or used as a support for the deposition of additional catalyst or co-catalyst.

After calcination, the composition adhering to the formula $A_a B_b Mn_y O_x$ can be verified through chemical testing. More specifically, the final composition may be $A_{0.05-0.25} B_{0.05-0.25} Mn_{0.50-0.90} O_x$ where A is the first promoter, B is the second promoter and x is the value of oxygen required to balance the valences of the formula. In some embodiments, A and B are the same element and the formula may be expressed as $A_{0.10-0.50} Mn_{0.50-0.90} O_x$.

When used as a support, the previously formed mixed oxide base is mixed with a nitrate, a carbonate or an oxide of cerium, lanthanum, zirconium, or yttrium reacted at 450° C. for four hours and calcined at 950-1100° C. at a rate of between 1 and 50° C./minute and held for 4 to 8 hours.

The product is then cooled under a dry inert atmosphere and used as the NOx oxidation catalyst. Some exemplary, non-limiting compositions include $Ce_{0.2}Mn_{0.8}O_x$, $Mg_{0.2}Mn_{0.8}O_x$, and $Al_{0.2}Mn_{0.8}O_x$.

Embodiments of the present disclosure may be used in catalytic systems comprising at least one of the compositions described above prepared by one of the methods above. The effectiveness of the embodiments may be affected by the way a particular embodiment is used in the exhaust process of a specific internal combustion system.

These catalytic systems, and more particularly these compositions, can have several applications. In some embodiments, the composition may be used as a wash coat within an exhaust system. The wash coat generally is coated onto a base, often made of ceramic or metal, and a noble metal is deposited on the wash coat. This coating may be obtained by mixing the composition with a support to form a suspension that can subsequently be deposited on a substrate. The wash coat may be used as a diesel oxidation catalyst (DOC), a diesel particulate filter (DPF), or a selective catalytic reduction (SCR) catalyst.

Some compositions are suited for and usable in the catalysis of various reactions, such as, but not limited to, dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, treatment of exhaust gases from internal combustion engines, demetallation, methanation, the shift conversion, oxidation of CO, purification of air by low temperature oxidation (<200° C., indeed even <100° C.), and catalytic oxidation of the soot emitted by internal combustion engines, such as diesel engines or petrol engines operating under lean burn conditions.

Some of the embodiments, such as, $Al_{0.1}Ce_{0.2}Mn_{0.7}O_x$, may be used in the purification of air, said air notably comprising carbon monoxide, ethylene, aldehyde, amine, mercaptan, ozone, volatile organic compounds, atmospheric pollutants, fatty acids, hydrocarbons, aromatic hydrocarbons, nitrogen oxides or malodorous compounds, comprising the step of bringing into contact gases with a catalytic system containing one or more of the above described compositions.

The following examples are included to illustrate performance embodiments of the invention and are non-limiting. Some embodiments include $Al_{0.1}Ce_{0.2}Mn_{0.7}O_x$ and $Zr_{0.25}Al_{0.25}Mn_{0.5}O_x$.

While embodiments in the present disclosure have been described in some detail, according to the preferred embodiments illustrated above, it is not meant to be limiting to modifications such as would be obvious to those skilled in the art.

The foregoing disclosure and description of the disclosure are illustrative and explanatory thereof, and various changes in the details of the illustrated apparatus and system, and the construction and the method of operation may be made without departing from the spirit of the disclosure.

What is claimed is:

1. A composition of matter comprising:
   a first promoter, comprising one of: aluminum (Al), barium (Ba), cerium (Ce), lanthanum (La), copper (Cu), iron (Fe), magnesium (Mg), titanium (Ti), yttrium (Y), zirconium (Zr), and zinc (Zn);
   a second promoter, comprising one of: aluminum (Al), barium (Ba), cerium (Ce), lanthanum (La), copper (Cu), iron (Fe), potassium (K), magnesium (Mg), titanium (Ti), yttrium (Y), zirconium (Zr), and zinc (Zn), but different from the first promoter;
   a manganese oxidizer; and
   oxygen, according to the formula $A_aB_bMn_yO_x$, wherein A is the first promoter, B is the second promoter, the additive value of a, b, and y is 1, a is in a range of 0.05-0.25, b is in a range of 0.05-0.25, and y is in a range of 0.50-0.90, x is selected to balance the valences of the formula, wherein said composition exhibits a NOx adsorption value of greater than 70 micromoles of NOx per gram at 300° C., and wherein the composition does not contain platinum group metals.

2. The composition of claim 1, wherein the $Mn_yO_x$ component is 50-70 wt % of the composition.

3. The composition of claim 1, wherein said composition exhibits a specific surface area of between 150 square meters per gram and 250 square meters per gram at room temperature.

4. The composition of claim 1, wherein said composition exhibits a NOx adsorption value of greater than 50 micromoles of NOx per gram at 100° C.

5. The composition of claim 1, wherein said composition exhibits a pore diameter between 5 nanometers and 20 nanometers.

6. The composition of claim 1, wherein said composition exhibits a pore volume between 0.3 mL/g and 0.5 mL/g.

7. The composition of claim 1, wherein said composition exhibits sulfur content below 0.5%.

8. The composition of claim 1, wherein said composition does not produce $N_2O$ in an exhaust gas stream in a temperature range of 100 to 350° C.

9. The composition of claim 1, wherein said composition, when in an exhaust gas stream with a temperature range of 200 to 350° C., is either adsorbing or releasing NOx continuously.

10. The composition of claim 1, wherein said composition has a total alkali metal content of less than 3%.

* * * * *